(12) United States Patent
Ono

(10) Patent No.: US 7,245,314 B2
(45) Date of Patent: Jul. 17, 2007

(54) IMAGE APPARATUS AND METHOD FOR CONVERTING SCANNED IMAGE DATA

(75) Inventor: Kenichi Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 981 days.

(21) Appl. No.: 10/059,238

(22) Filed: Jan. 31, 2002

(65) Prior Publication Data

US 2002/0135789 A1    Sep. 26, 2002

(30) Foreign Application Priority Data

Feb. 2, 2001  (JP) .............................. 2001-026875
Mar. 26, 2001 (JP) .............................. 2001-086523
Jan. 21, 2002 (JP) .............................. 2002-011832

(51) Int. Cl.
B41J 2/47 (2006.01)

(52) U.S. Cl. .................................................... 347/252

(58) Field of Classification Search .............. 347/237, 347/239–240, 251–255; 358/1.1–1.2, 3.06, 358/3.1, 525, 530, 480, 447, 1.6–1.8, 515, 358/518–521

See application file for complete search history.

(56) References Cited

U.S. PATENT DOCUMENTS 3,956,583 A * 5/1976 Pugsley ...................... 358/480
5,182,575 A   1/1993 Kato et al.
5,379,126 A * 1/1995 Seto et al. ................. 358/3.06
5,387,985 A * 2/1995 Loce et al. ................. 358/447
5,926,616 A * 7/1999 Sato et al. .................. 358/1.2
6,091,512 A   7/2000 Sasanuma et al.
6,445,404 B1 * 9/2002 Kerby et al. ............... 347/237

FOREIGN PATENT DOCUMENTS

| EP | 0 216 462 | 4/1987 |
|----|-----------|--------|
| EP | 0 843 232 | 5/1998 |
| GB | 2 026 283 | 1/1980 |
| JP | 2-76755   | 3/1990 |
| JP | 2-243363  | 9/1990 |
| JP | 8-9119    | 1/1996 |
| JP | 8-317157  | 11/1996 |
| JP | 9-275494  | 10/1997 |

OTHER PUBLICATIONS

U.S. Appl. No. 10/059,238, filed Jan. 31, 2002, Ono.
U.S. Appl. No. 10/462,662, filed Jun. 17, 2003, Niito.
U.S. Appl. No. 10/725,470, filed Dec. 3, 2003, Ono.
U.S. Appl. No. 10/757,390, filed Jan. 15, 2004, Ono.
U.S. Appl. No. 11/558,758, filed Nov. 10, 2006, Ono.

* cited by examiner

*Primary Examiner*—Hai Pham
(74) *Attorney, Agent, or Firm*—Oblon, Spivak, McClelland, Maier & Neustadt, P.C.

(57) ABSTRACT

An imaging apparatus forming an image by performing scanning by deflecting a light beam includes a data conversion part that converts multi-bit input image data into data specifying a pulse width or intensity of the light beam. The image data is input to the data conversion part a given number of times in succession, and the data conversion part performs a different data conversion for each of scanning lines of the given number based on the input image data.

11 Claims, 17 Drawing Sheets

FIG.16
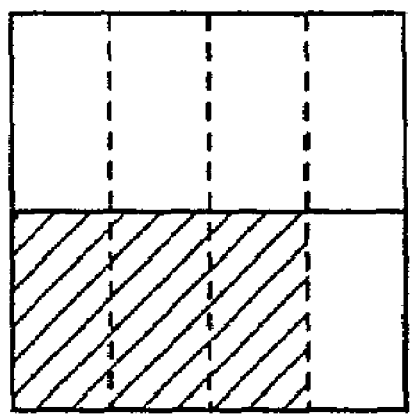
UPPER LINE : 0
LOWER LINE : 3
DUTY : 37.5%
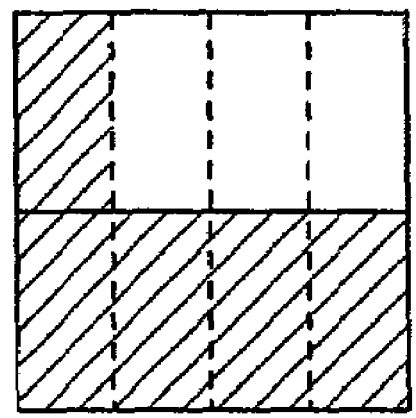
UPPER LINE : 1
LOWER LINE : 4
DUTY : 62.5%

IMAGE APPARATUS AND METHOD FOR CONVERTING SCANNED IMAGE DATA

BACKGROUND OF THE INVENTION

1. Field of the Invention

The present invention generally relates to imaging apparatuses and methods, and more particularly to an imaging apparatus and method that are suitable as and for a laser printer, a digital copier, or a facsimile apparatus having a writing unit that performs image exposure on a photosensitive body by deflecting a light beam by using a deflector.

2. Description of the Related Art

Recently, imaging apparatuses such as printers have been designed to have a higher image density so that printers that can perform writing at 1200 dpi have been put into practical use. On the other hand, most of the commercially available conventional digital copiers having a printing function have a resolution of 600 dpi as a copying function. It is considered that a complex machine of a 1200-dpi printer and a 600-dpi digital copier can be realized without changing the number of rotations of a polygon mirror and the frequency of a print pixel clock signal by printing a copied image of 600 dpi by outputting the same data for each of 2×2 dots in a primary or main scanning direction and a secondary or sub scanning direction at 1200 dpi. This method is employed, for instance, in printing an image of 300 dpi by the conventional 600-dpi printer. A specific method of realizing this method is disclosed, for instance, in Japanese Laid-Open Patent Application No. 8-9119.

Further, Japanese Laid-Open Patent Application No. 9-275494 discloses a method of increasing the number of gradations by doubling image density in the primary scanning direction and assigning different data to each pixel having the doubled image density.

Generally, the frequency of a print pixel clock signal is proportional to the product of writing densities in the primary and secondary scanning directions. Therefore, given the same linear velocity, the frequency of the print pixel clock signal is four times as high in a printer engine of 1200×1200 dpi as in a printer engine of 600×600 dpi. For instance, if a printer of 600 dpi of approximately 20 ppm has a print pixel clock signal frequency of 25 MHz, the printer is required to have a print pixel clock signal frequency as high as 100 MHz to serve as a printer of 1200 dpi.

Laser diode (LD) multi-level modulation is realized by the above-described various methods. However, as the frequency of the print pixel clock signal becomes higher, it becomes more difficult to increase the number of modulation values. A method of performing pulse-width modulation (PWM) by using a high-speed clock signal using phase-locked loop (PLL) is well-known, for instance. It is known that this method may be realized by generating, inside an IC, a clock signal having a frequency of 400 MHz by using PLL and outputting from the clock signal a pixel clock pulse signal of 100 MHz that is pulse-width-modulated to have a one-fourth resolution. In this case, the multi-level or grayscale resolution of one dot in the case of writing at 1200 dpi can be selected from five ¼-apart pulse widths of 0, /1;4, /1;2, /3;4, and 1. Therefore, the method is a PWM method with five values.

SUMMARY OF THE INVENTION

In the case of outputting an image of 600 dpi by this printer, the five-value modulation can be performed with respect to each one dot of 600 dpi when the same data is printed out for each of 2×2 dots in the primary and secondary scanning directions at 1200 dpi. Alternatively, by using the above-mentioned method disclosed in Japanese Laid-Open Patent Application No. 9-275494 by which method different data is assigned to each pixel having doubled image density in the primary scanning direction, PWM dividing one dot into eight parts in the primary scanning direction can be realized so that PWM with nine modulation values can be performed as shown in FIG. 1.

In this case, in outputting an image of 1200 dpi by the five-value PWM based on an image of a low resolution of 600 dpi, the number of grayscale resolution values is increased to nine so that the image may be output with high quality at 1200 dpi.

Thus, in the case of outputting image data of a lower resolution by a printer engine of a higher resolution, more reliable density representation can be realized in print results without depending on the substantial resolution of an optical writing unit not by simply copying the same data for a plurality of dots for printing but by considering as a group dots created from a dot of the lower resolution by performing printing at the higher resolution as shown in FIG. 1 and determining a pulse width of PWM by the group.

In view of the above-described situation, the present invention has an object of increasing the number of grayscale resolution values by performing a different data conversion for each scanning line and outputting an image of a lower resolution with high quality by a printer engine of a higher resolution.

Another object of the present invention is to realize a different data conversion part for each scanning line by a simple configuration and to output an image of a lower resolution with high quality by a printer engine of a higher resolution.

The above objects of the present invention are achieved by an imaging apparatus forming an image by performing scanning by deflecting a light beam, the imaging apparatus including a data conversion part that converts multi-bit input image data into data specifying a pulse width or intensity of the light beam, wherein the image data is input to the data conversion part a given number of times in succession, and the data conversion part performs a different data conversion for each of scanning lines of the given number based on the input image data.

According to the above-described imaging apparatus, by performing a different data conversion for each scanning line so that one dot can be formed by a plurality of scans, the number of grayscale resolution values of one dot may be increased, a variety of dot shapes may be formed, and an image may be output with high quality.

The above objects of the present invention are also achieved by a multi-beam imaging apparatus forming an image by performing scanning by simultaneously deflecting a plurality of light beams, the multi-beam imaging apparatus including a plurality of data conversion parts provided individually for the corresponding light beams, the data conversion parts determining pulse widths or intensities of the corresponding light beams based on input multi-bit image data and performing different data conversions from each other.

According to the above-described multi-beam imaging apparatus, by performing different data conversion for each beam so that one dot may be formed by one multi-beam scan, the number of grayscale resolution values of one dot may be increased, a variety of dot shapes may be formed, and an image may be output with high quality.

The above objects of the present invention are also achieved by an imaging apparatus outputting print image data in accordance with input image data, wherein gradation representation is performed by inputting image data of a resolution lower than that of the imaging apparatus and outputting different data for each of a given number of pixels in a secondary scanning direction, the image data having equal values for the pixels.

The above objects of the present invention are further achieved by an imaging method outputting print image data in accordance with input image data, wherein gradation representation is performed by inputting image data of a resolution lower than that of an imaging apparatus and outputting different data for each of a given number of pixels in a secondary scanning direction, the image data having equal values for the pixels.

BRIEF DESCRIPTION OF THE DRAWINGS

Other objects, features and advantages of the present invention will become more apparent from the following detailed description when read in conjunction with the accompanying drawings, in which:

FIG. 16 is a diagram for illustrating grayscale resolution values of one dot in the case of weighting a lower one of scanning lines.

DETAILED DESCRIPTION OF THE PREFERRED EMBODIMENTS

A description will now be given, with reference to the accompanying drawings, of embodiments of the present invention.

Figure 1:
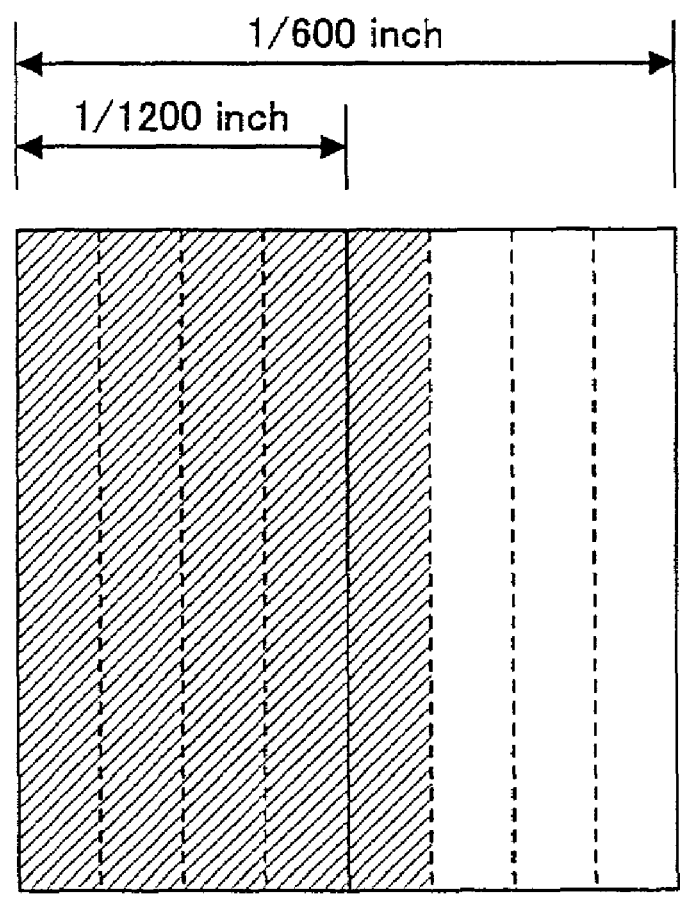
FIG. 1 is a diagram for illustrating the fact that the number of grayscale resolution values of one dot is nine when an image of 1200 dpi by five-value PWM is output based on an image of a low resolution of 600 dpi.
Figure 2:
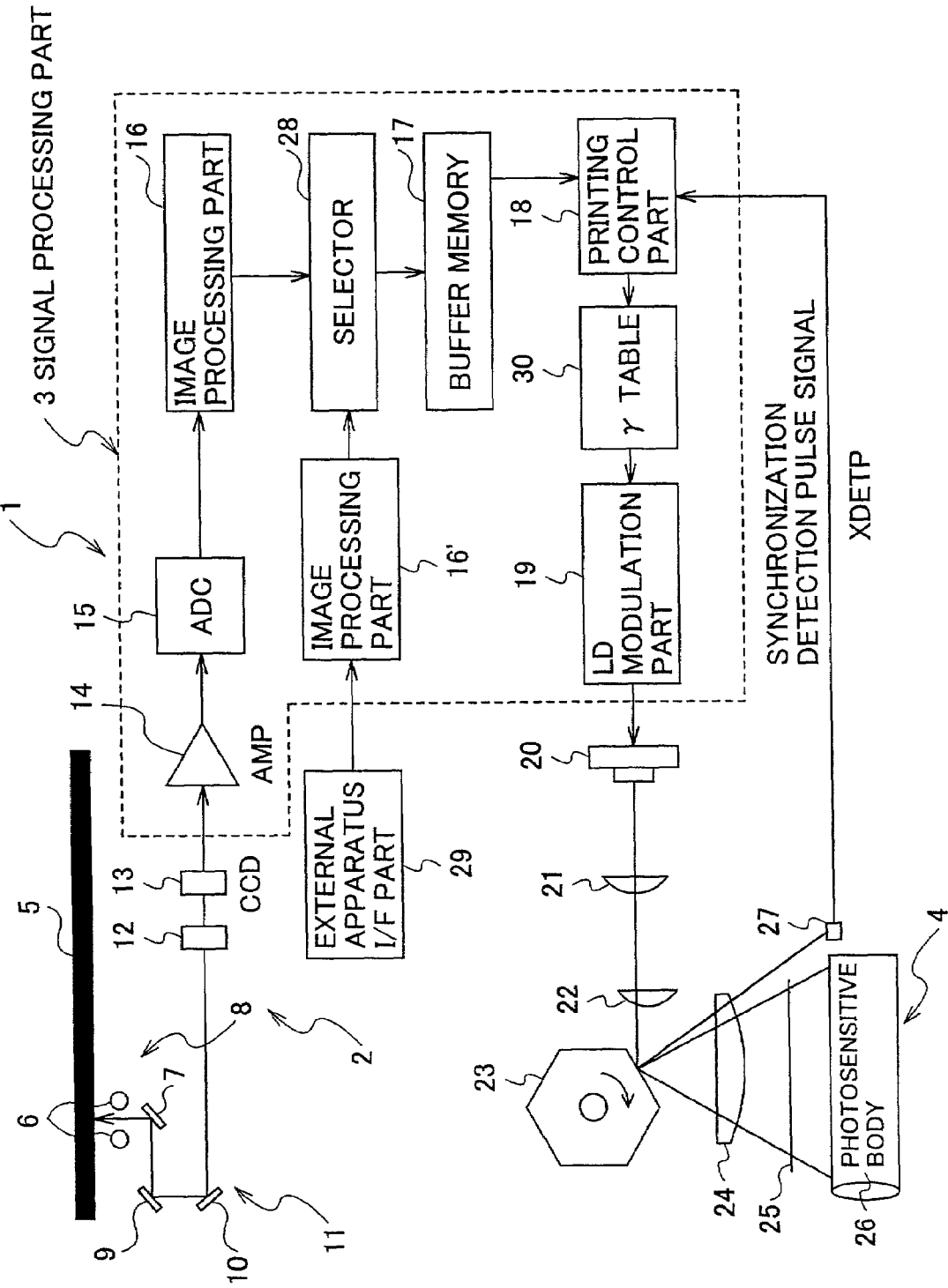
FIG. 2 is a schematic block diagram showing a configuration of a digital copier that is an imaging apparatus according to a first embodiment of the present invention.

FIG. 2 is a schematic diagram showing a configuration of a digital copier 1 that is an imaging apparatus according to a first embodiment of the present invention. The digital copier 1 is composed of an image reading part 2 that reads and captures the printed image of an original sheet (not shown in the drawing), a signal processing part 3 that performs a variety of processing on image data input from the image reading part 2, and an image printing part 4 that prints out the image data output from the signal processing part 3 on a paper sheet (not shown in the drawing).

The image reading part 2 includes a contact glass 5 on which the original sheet is placed, a first scanning unit 8 composed of a line light source 6 having length in a primary or main scanning direction and a reflection mirror 7 reflecting a reflected light from the original sheet, and a second scanning unit 11 composed-of a pair of reflection mirrors 9 and 10 provided in the path of the reflected light. The first and second scanning units 8 and 11 are supported under the contact glass 5 so as to be freely movable in a secondary or sub scanning direction with a velocity ratio of 2:1. The image reading part 2 further includes an imaging optical system 12 and a charge-coupled device (CCD) sensor 13 successively provided in the light path.

The signal processing part 3 includes an amplifier 14 connected to the CCD sensor 13 of the image reading part 2, an analog-to-digital (A/D) converter 15 connected to the amplifier 14, image processing parts 16 and 16' that perform a variety of processing on digital image data supplied from the A/D converter 15 and an external apparatus interface (I/F) part 29, respectively, a selector 28 that selects one of the image data supplied from the image processing part 16 and the image data supplied from the image processing part 16', a buffer memory 17 temporarily storing the image data supplied from the selector 28, a printing control part 18 that controls start timing of reading the stored data from the buffer memory 17, a γ table 30 that converts the image data into modulation code data, and a laser diode (LD) modulation part 19 that controls the image printing part 4 based on the modulation code data supplied from the γ table 30.

The image printing part 4 includes an LD 20 connected to the LD modulation part 19 of the signal processing part 3, a collimator lens 21 and a cylindrical lens 22 provided in the path of light emitted from the LD 20, and a polygon mirror 23 provided rotatably in the primary scanning direction so that its reflection surface is positioned in the path of the emitted light. Further, the image printing part 4 includes an fθ lens 24 and a reflection mirror 25 provided in the primary scanning light path of the polygon mirror 23, and a photosensitive body drum 26 provided rotatably in the secondary scanning direction so that its scanned surface is positioned in the primary scanning light path. In the image printing part 4, a synchronization detector 27 composed of a photosensor is provided in a position on which the light deflected by the polygon mirror 23 is incident immediately before the light is incident on the photosensitive body drum 26 for scanning in the primary direction. The synchronization detector 27 has its output terminal connected to the printing control part 18 of the signal processing part 3 so as to feed back a synchronization detection pulse signal XDETP thereto.

By the above-described configuration, the digital copier 1 has the image data read and captured by the image reading part 2 or the image data input from the external apparatus I/F part 29 printed out on the paper sheet by the image printing part 4. In this process, the image data is temporarily stored in the signal processing part 3 so that a data rate adjustment is made between the input rate of the image reading part 2 and the output rate of the image printing part 4.

More specifically, in the case of copying the image from the original sheet, the image reading part 2 has the first and second scanning units 8 and 11 scanning the printed image of the original sheet placed on the contact glass 5 in the secondary scanning direction so that the light reflected from the original sheet is focused on the CCD sensor 13 through the imaging optical system 12. Therefore, the CCD sensor 13 outputs dot-matrix image data composed of primary scanning lines that are successive in the secondary scanning direction to the signal processing part 3 line by line. At this point, the CCD sensor 13 outputs the image data of each line pixel by pixel in the primary scanning direction in accordance with given pixel clock timing after resetting the addresses of the image data by a line synchronization signal LSYN. The image data is output to the signal processing part 3 line by line at a given line cycle based on the scanning speeds of the first and second scanning units 8 and 11 and the reading cycle of the CCD sensor 13.

Next, in the signal processing part 3, the image data input line by line is amplified by the amplifier 14 and is converted from an analog value to a digital value by the A/D converter 15. Then, the image data is subjected to a variety of processing such as lightness correction, magnification change processing, and editing in the image processing part 16 and is supplied to the buffer memory 17 via the selector 28 as multi-bit multi-level or grayscale image data. As will be described later, the printing control part 18 outputs a timing control signal to the buffer memory 17 so that the image data stored in the buffer memory 17 is read out to the printing control part 18 in accordance with the timing control signal.

The printing control part 18 performs a variety of processing such as range restriction and pattern combination on the input image data and supplies the grayscale image data to the γ table 30. The γ table 30 converts the grayscale image data supplied from the printing control part 18 into the modulation code data and outputs the modulation code data to the LD modulation part 19. The LD modulation part 19 outputs to the LD 20 of the image printing part 4 a driving current that is modulated in accordance with the modulation code data.

On the other hand, in the case of printing data supplied from an external apparatus, the image data is input to the buffer memory 17 via the image processing part 16' and the selector 28 from the external apparatus I/F part 29, and thereafter, the LD 20 is actuated in accordance with modulation code data by the same operation as the above-described copying operation. The image processing part 16' expands character code data and graphic data input from a host computer (not shown) via the external apparatus I/F part 29 into raster data and performs image processing such as contour correction so as to output multi-bit grayscale image data.

The LD modulation part 19 controls a beam emitted onto the photosensitive body drum 26 by employing PWM (modulation of the duration of light emission by a laser diode), power modulation (modulation of the light-emission power of a laser diode), or a combination of both modulation methods.

Figure 3:
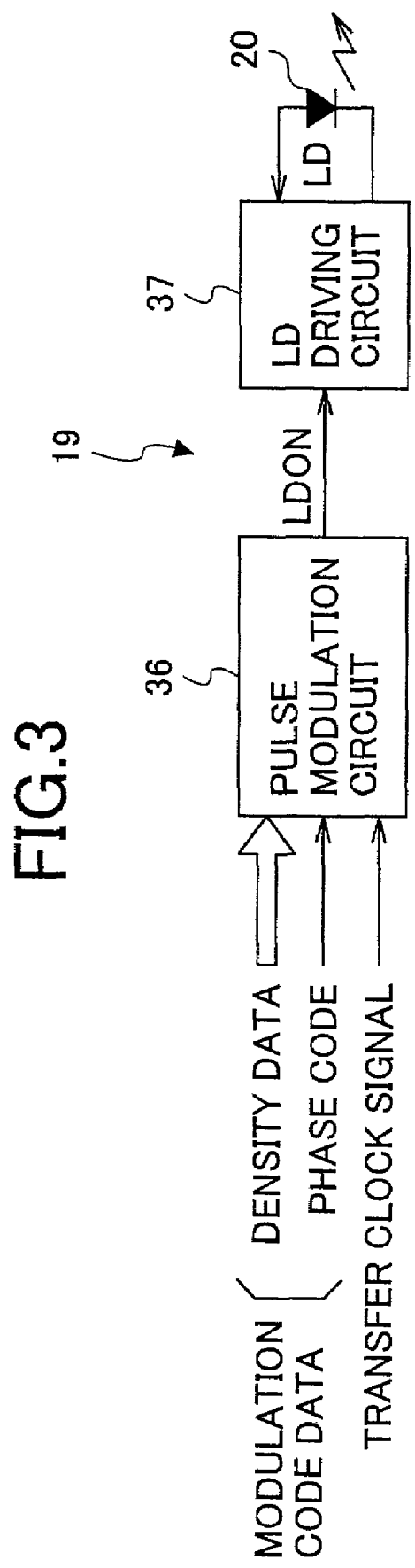
FIG. 3 is a block diagram showing a configuration of an LD modulation part of the digital copier of FIG. 2.

FIG. 3 is a block diagram showing a configuration of the LD modulation part 19.

The modulation code data, which is composed of multi-bit pulse-width data (density data) and a phase code, is supplied from the γ table 30 to be input to a pulse modulation circuit 36 in accordance with transfer clock timing. Then, the pulse modulation circuit 36 generates pulses in accordance with the modulation code data, and outputs the pulses to an LD driving circuit 37 as an LD ON signal LDON. The LD driving signal 37 supplies an electric current to the LD 20 in accordance with the LD ON signal LDON to cause the LD 20 to emit light. This embodiment shows the case of PWM, but a modulation method such as a combination of PWM and power modulation as disclosed in Japanese Laid-Open Patent Application No. 2-243363 may be employed.

The modulation code data is a signal showing a pattern in which the LD 20 emits light in a period of time corresponding to one pixel, and is composed of three-bit pulse-width data and a single-bit phase code, for instance. The pulse-width data shows the ratio of a period of time or energy of light emission by the LD 20. Hereinafter, the ratio is referred to as duty. The phase code shows the light-emission timing of the LD 20 within a one-pixel period of time, or a period of time corresponding to one pixel.

Figure 4:
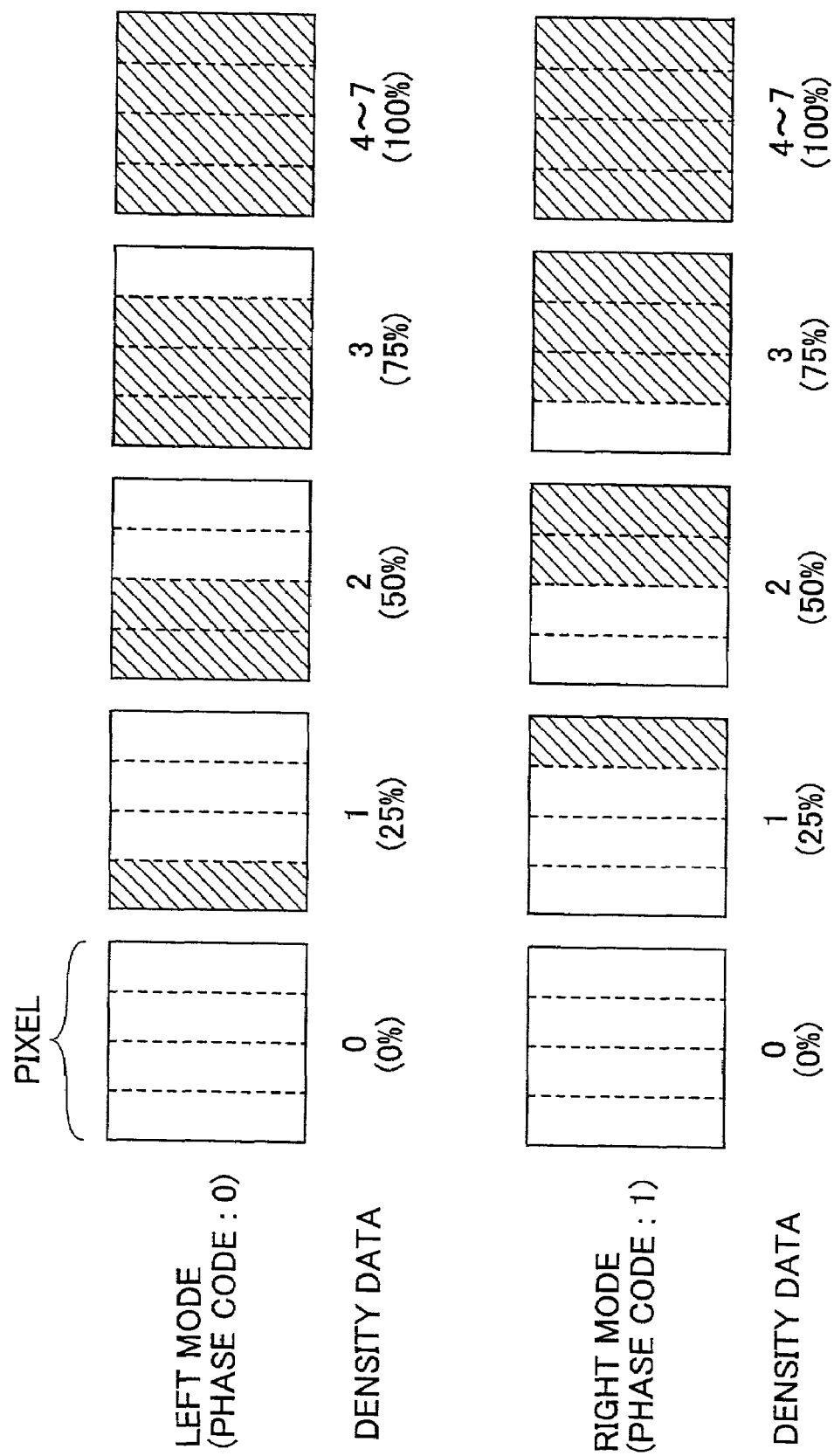
FIG. 4 is a diagram for illustrating the fact that five-value PWM is performed when writing is performed at 1200 dpi by LD multi-level modulation.

FIG. 4 is a diagram showing a relationship between the modulation code data composed of the pulse-width data (density data) and the phase mode and a dot formation position that is the output pattern of the LD 20. In FIG. 4, the pulse widths of duties of five values of 0, 25, 50, 75, and 100% are switched by the three-bit pulse-width data (density data) and left and right modes are switched by the single-bit phase code.

Here, three-bit pulse-width data 0 through 4 show the duties of 0, 25, 50, 75, and 100%, respectively, and like the pulse-width data 4, pulse-width data 5 through 7 show the duty of 100% for redundancy.

If the imaging apparatus performs primary or main scanning from left to right, a dot is formed in the left side of a pixel when the LD 20 is turned on early in the one-pixel period of time (this dot formation is referred to as a left mode) and in the right side of the pixel when the LD 20 is turned on late in the one-pixel period of time (this dot formation is referred to as a right mode). For instance, the dot formation mode is determined to be the left mode when the phase code is 0 and to be the right mode when the phase code is 1. In this embodiment, the pulse-width data and the phase code are provided separately from each other. However, the modulation code data may be expressed as a three-bit code without separating the pulse-width data from the phase code since the phase code has no significance in the case of the duties of 0 and 100%.

In the image printing part 4, the light emitted from the LD 20 actuated in accordance with the modulation code data is converged by the collimator lens 21 and the cylindrical lens 22 to be deflected by the polygon mirror 23 for scanning. This scanning light is corrected by the fθ lens 24 to be focused on the scanned surface of the photosensitive body drum 26 which surface moves in the secondary scanning direction. Thereby, a dot-matrix electrostatic latent image is formed on the scanned surface of the photosensitive body drum 26. The electrostatic latent image is developed by toner (not shown in the drawing) and transferred onto the paper sheet. Thereby, image printing is realized.

In the image printing part 4, the synchronization detector 27, on which the primary or main scanning light deflected by the polygon mirror 23 is incident immediately before the primary scanning light is incident on the photosensitive body drum 26, outputs the synchronization detection signal XDETP, and the printing control part 18 of the signal processing part 3, to which the synchronization detection signal XDETP is input, outputs the timing control signal to the buffer memory 17. The output timing of the timing control signal is changed based on the size and the register adjustment value of the paper sheet onto which the electrostatic latent image is transferred so that the image data temporarily stored in the buffer memory 17 of the signal processing part 3 is read out to the print output of the image printing part 4 with proper timing.

Figure 5:
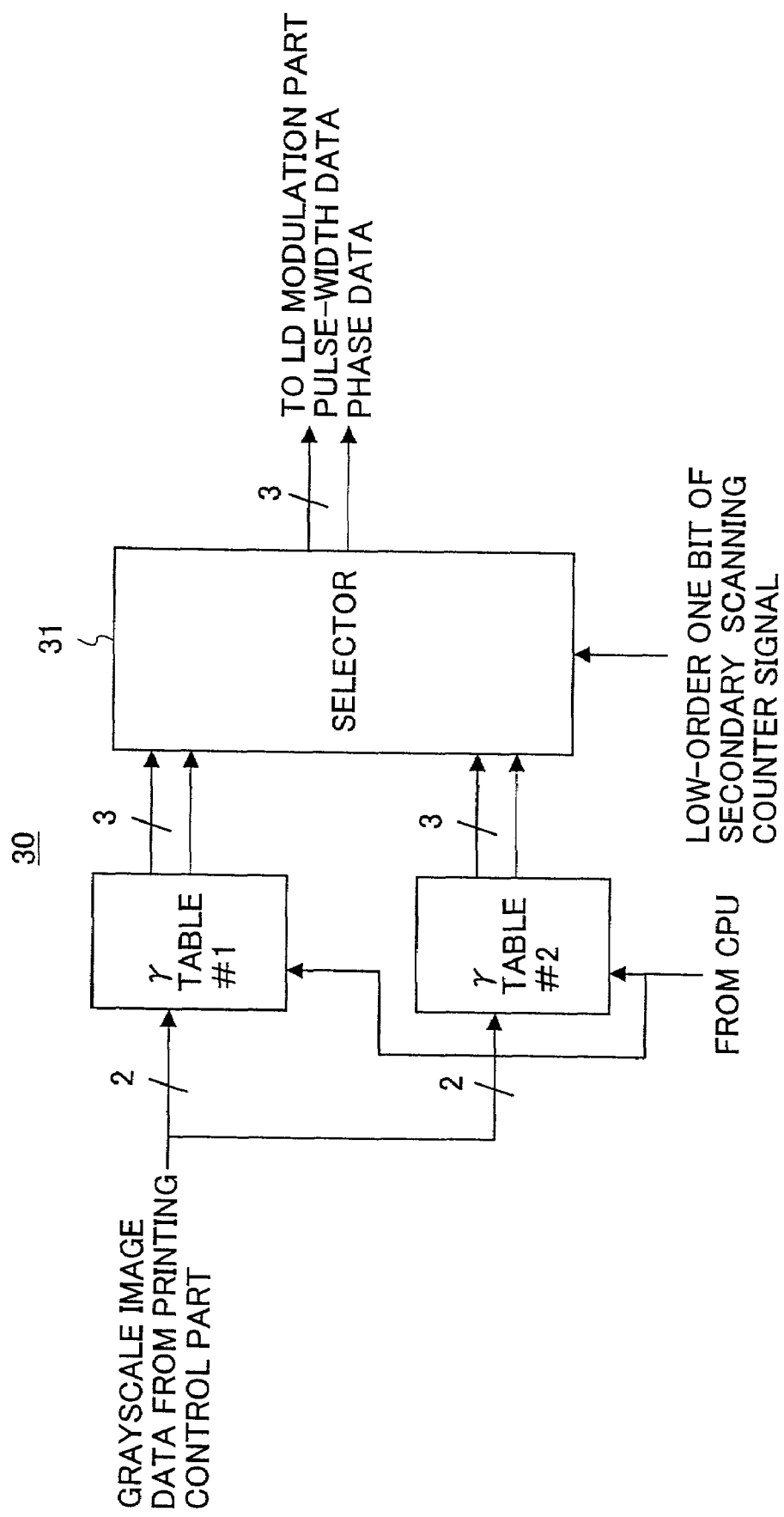
FIG. 5 is a block diagram showing a configuration of a γ table of the digital copier of FIG. 2.

FIG. 5 is a circuit block diagram showing a no configuration of the γ table 30 that is a data conversion part according to the first embodiment of the present invention. This embodiment assumes the case of outputting an image of a resolution of 600 dpi by a printer engine of a higher resolution of 1200 dpi. In this case, the same data is read out from the buffer memory 17 for a pair of scanning lines. Therefore, with respect to the image data supplied from the printing control part 18, the same data is input to the γ table 30 for the two successive lines.

In this embodiment, the γ table 30 includes two γ tables #1 and #2 that are data conversion parts. The value of each of the γ tables #1 and #2 may be changed by a central processing unit (CPU) (not shown). The output data of each of the γ tables #1 and #2 is input to a selector 31, where one of the output data is selected by a low-order one bit of a secondary scanning counter signal and output to the LD modulation part 19. The secondary scanning counter signal, which is not shown in the drawing, is a counter signal that is incremented by the above-described synchronization detection signal XDETP. Therefore, the low-order one bit of the secondary scanning counter signal alternates between 0 and 1. Hence, the γ tables #1 and #2 are alternately used for write scanning lines. That is, the same data is input to the γ table 30 twice in succession so that the data converted by the γ table #1 for one line and the data converted by the γ table #2 for the next line are output in the order described one by one. Accordingly, the different data for the two lines are written adjacently to each other in the secondary scanning direction.

In this embodiment, for simplicity of description, the two γ tables are provided so that the γ table used for each write scanning line alternates between the γ tables #1 and #2. However, the same configuration can be realized by correlating the low-order one bit of the secondary scanning counter signal with the address of one γ table.

Figure 6:
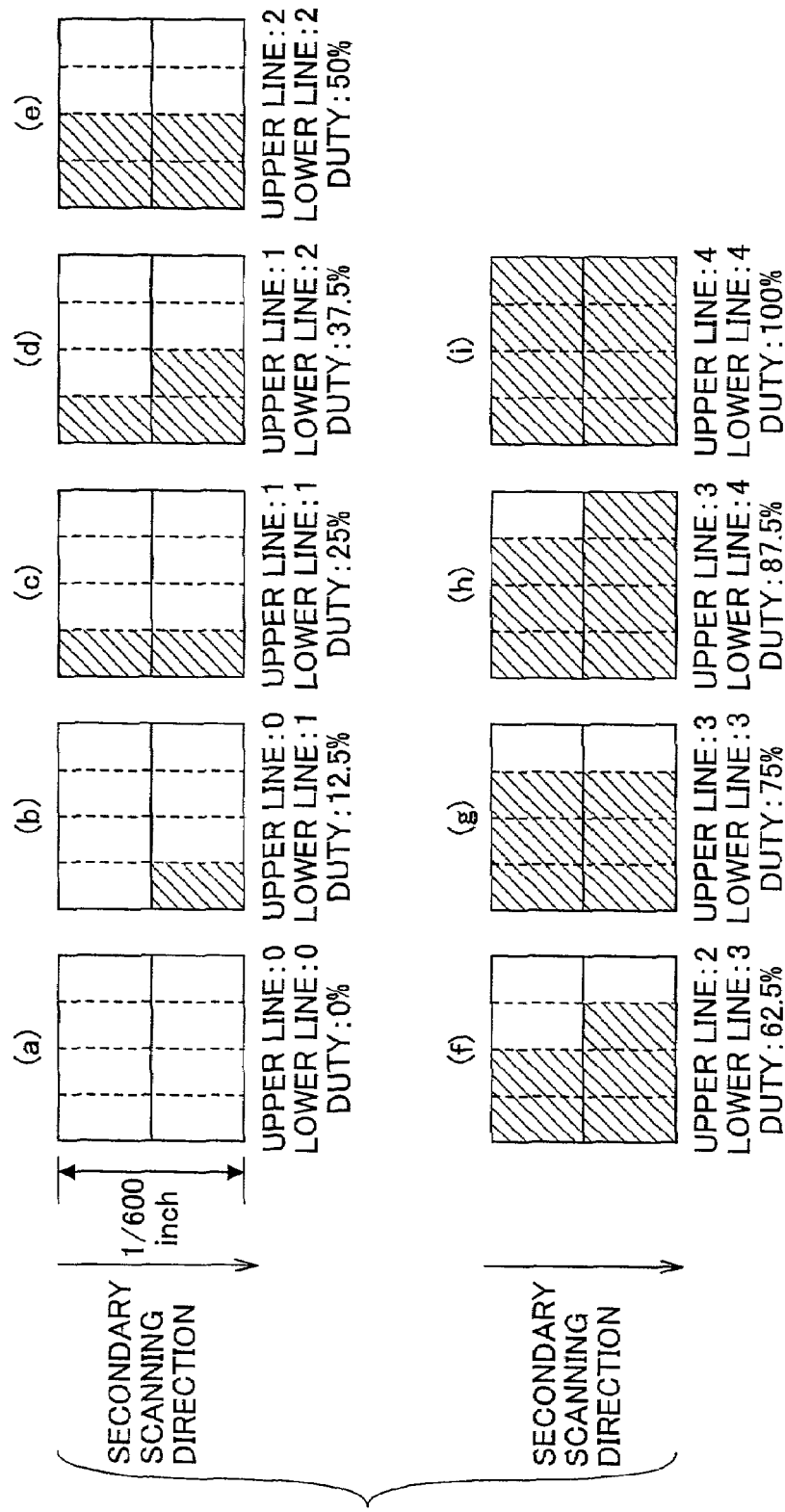
FIG. 6 is a diagram for illustrating the fact that nine-value density gradation representation can be realized by PWM with ¼-apart resolution values by using the γ table of FIG. 5.
Figure 7:
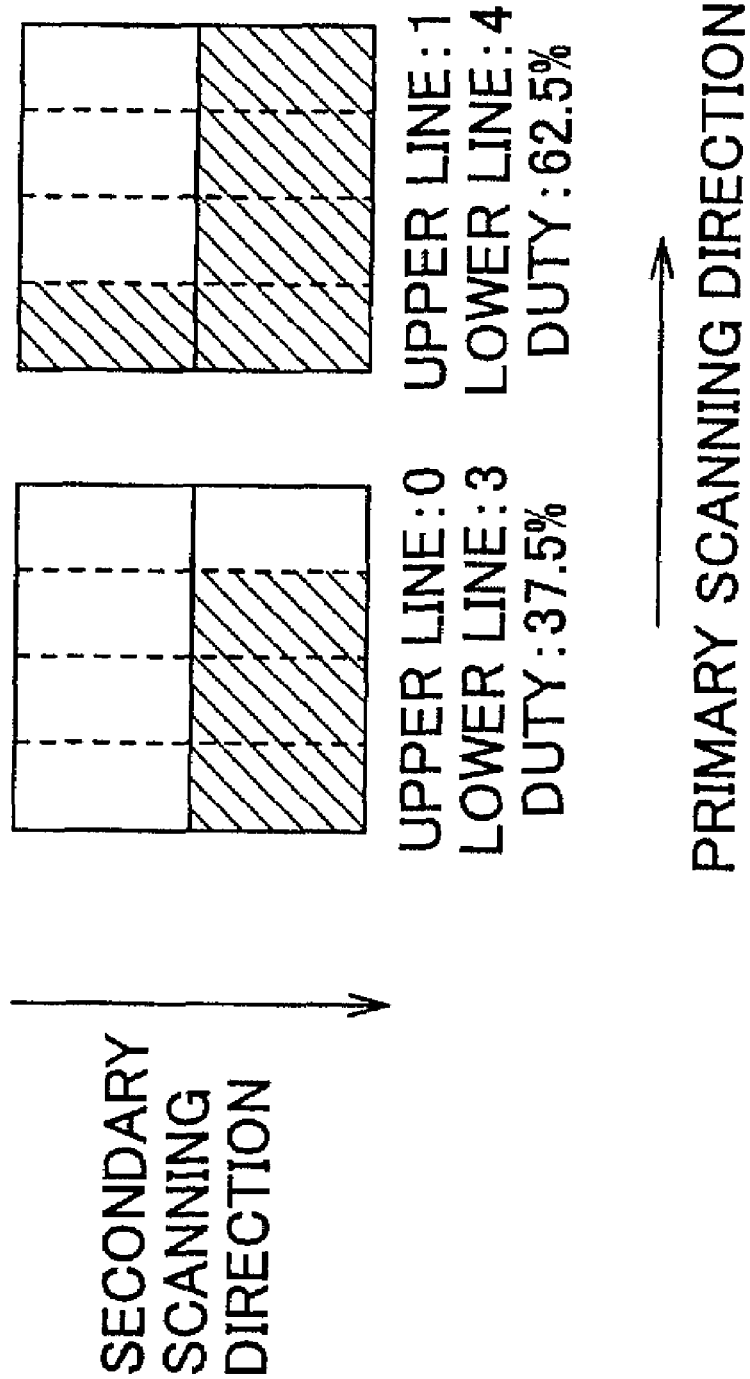
FIG. 7 is a diagram for illustrating the fact that a lower one of two scanning lines can be weighted by using the γ table of FIG. 5.

Provided that the pulse-width data and the phase code of the γ table #1 corresponding to grayscale image data 01b supplied from the printing control part 18 are given as 1 and 0 and the pulse-width data and the phase code of the γ table #2 corresponding to the grayscale image data 01b are given as 2 and 0, for instance, data for three-eights eighths density of one dot can be created as shown in FIG. 6(d). That is, as shown in FIG. 6, nine densities by ⅛-apart resolution values can be created by PWM with ¼-apart resolution values. Alternatively, the image data can be converted so that the lower of two adjacent scanning lines is weighted as shown in FIG. 7. Thereby, a horizontal fine line with a narrow width can be formed.

Figure 8:
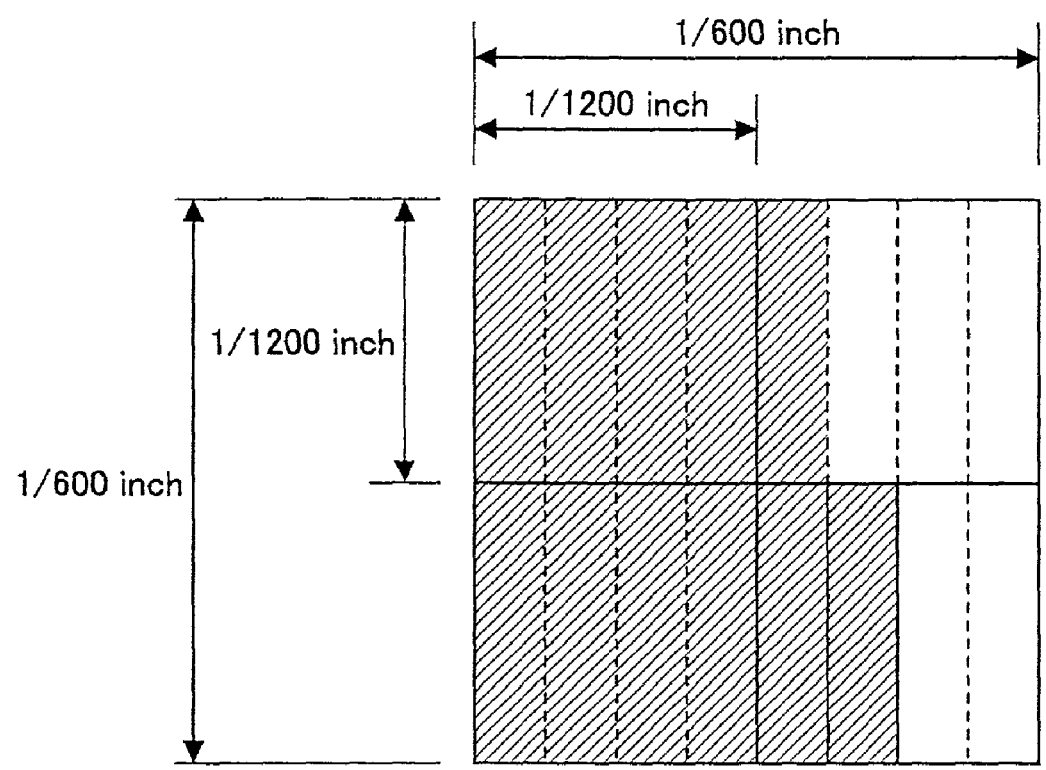
FIG. 8 is a diagram for showing that 17-value density gradation representation can be realized by using the γ table of FIG. 5.

Further, by using the method disclosed in Japanese Laid-Open Patent Application No. 9-275494 by which method different data is assigned to each pixel having doubled image density in the primary scanning direction, 17 densities by ¹⁄₁₆-apart resolution values can be realized as shown in FIG. 8.

As for the operation of the γ table 30 shown in FIG. 5, a description given later with reference to TABLE 1 in a second embodiment should be referred to.

As another technology, there has been proposed recently a multi-beam imaging apparatus including a write optical system that records a plurality of lines at the same time by using a plurality of laser beams. Such a multi-beam imaging apparatus is capable of writing an image of a plurality of lines by using one side of the polygon mirror, and accordingly, is capable of performing high-speed writing with a low-speed polygon motor and a low-powered laser diode.

As previously described, recently, imaging apparatuses such as printers have been designed to have a higher image density so that printers that can perform writing at 1200 dpi have been put into practical use. On the other hand, most of the commercially-available conventional digital copiers having a printing function have a resolution of 600 dpi as a copying function.

Here, as described above, it is considered that a complex machine of a 1200-dpi printer and a 600-dpi digital copier can be realized without changing the number of rotations of a polygon mirror and the frequency of a print pixel clock signal by printing a copied image of 600 dpi by outputting the same data for each of 2×2 dots in the primary and secondary scanning directions at 1200 dpi.

This method is employed, for instance, in printing an image of 300 dpi by the conventional 600-dpi printer. As disclosed specifically in Japanese Laid-Open Patent Application No. 8-9119, this method is realized by outputting an image data reading start signal as the writing start signal of a data writing part only once in every given number of times or by incrementing a readout address after dividing the frequency of a readout clock signal for reading out data by n (=any integer).

Further, Japanese Laid-Open Patent Application No. 9-275494 discloses a method of increasing the number of gradations by doubling image density in the primary scanning direction and assigning different data to each pixel having the doubled image density.

In such a technology of conversion from one pixel density to another pixel density, the frequency of a print pixel clock signal is proportional to the product of writing densities in the primary and secondary scanning directions. Therefore, given the same linear velocity, the frequency of the print pixel clock signal is required to be four times as high in a printer engine of 1200×1200 dpi as in a printer engine of 600×600 dpi. For instance, if a single-beam printer of 600 dpi of approximately 20 ppm has a print pixel clock signal frequency of 25 MHz, the printer is required to have a print pixel clock signal frequency as high as 100 MHz to serve as a printer of 1200 dpi.

This frequency of 100 MHz is equal to that required to make a dual-beam printer of approximately 40 ppm serve as a printer of 1200 dpi.

Here, as the frequency of the print pixel clock signal becomes higher, it becomes more difficult to increase the number of modulation values in multi-level modulation in an LD modulation part. For instance, in the case of performing PWM by using a high-speed clock signal using phase-locked loop (PLL), employed is a well-known method that generates, inside an IC, a clock signal having a frequency of 400 MHz by using PLL and outputs from the clock signal a pixel clock pulse signal of 100 MHz that is pulse-width-modulated with ¼-apart resolution values.

In this case, the grayscale resolution of one dot in the case of writing at 1200 dpi can be selected from five ¼-apart pulse widths of 0, /1;4, /1;2, /3;4, and 1. Therefore, the method is a PWM method with five values. In the case of outputting an image of 600 dpi by this printer, as shown in the prior art, the five-value modulation can be performed with respect to each dot of 600 dpi if the same data is printed out for 2×2 dots in the primary and secondary scanning directions at 1200 dpi.

Figure 13:
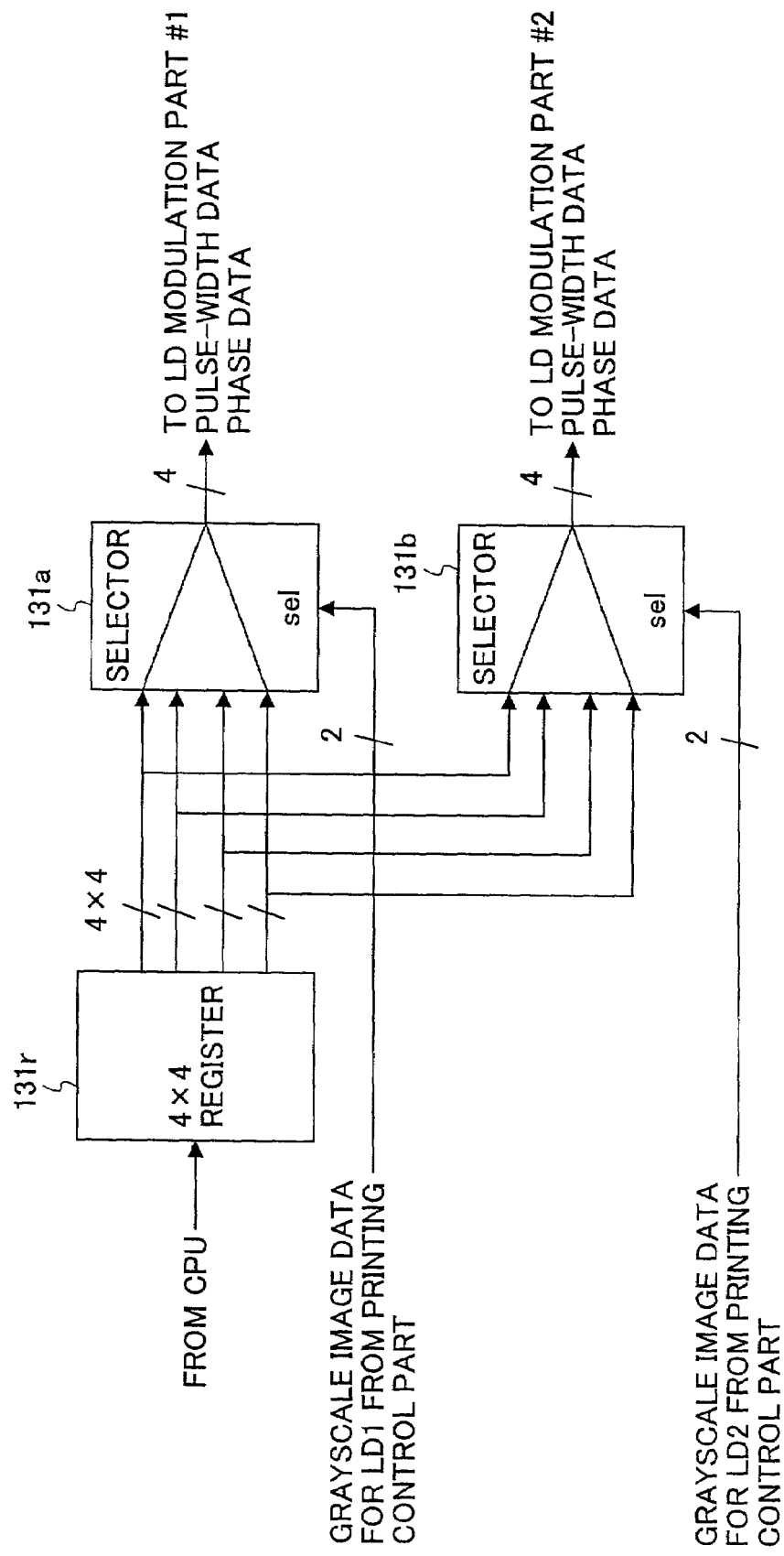
FIG. 13 is a block diagram showing an example configuration that can be assumed as a configuration of a data conversion part of the digital copier of FIG. 9.

In performing multi-beam image formation based on the premise of such pixel density conversion, a data conversion part as shown in FIG. 13 is considered necessary between a printing control part and the LD modulation part. The data conversion part, for instance, is composed of a common register 131$r$ and selectors 131$a$ and 131$b$ for multiple beams. The contents of the register 131$r$ are rewritable by a CPU that is a control part, and data matching an engine characteristic is prewritten to the register 131$r$. In this example, four types of four-bit data each composed of three-bit pulse width data (density data) and single-bit data of a phase code are written to the register 131$r$. A given one of the four types of data is selected and output by each of the selectors 131$a$ and 131$b$ based on two-bit grayscale image data for each beam supplied from the printing control part.

However, since the above-described register 131$r$ is shared by the beams, the register 131$r$ is prevented from performing different data conversions for the beams that are output simultaneously. Therefore, the register 131$r$ is prevented from setting an independent value for each beam.

According to the present invention, an object of which is to eliminate the above-described disadvantage, an image of a lower resolution can be output with high quality by a printer engine of a higher resolution with the increased number of grayscale resolution values by performing a different data conversion for each-of the beams of a multi-beam imaging apparatus.

According to the present invention, in order to achieve the above-described object, an individual data conversion part determining a pulse width or intensity of a light beam based on multi-bit image data is provided for each of the light beams so that each individual data conversion part can perform a different data conversion in a multi-beam imaging apparatus forming an image by performing scanning by deflecting the multiple light beams.

Further, the data conversion parts may be composed of a plurality of conversion tables using storage parts, and any independent value may be set in each conversion table for a corresponding light beam by a control part.

Alternatively, the data conversion parts may convert input grayscale image data into different modulation code data for multiple light beams output simultaneously.

Further, each of the data conversion parts for the multiple light beams may include a register to which pulse-width data and a phase code are input rewritably and a selector selecting given data from the contents of the register. The rewritable pulse-width data and phase code are preferably matched in advance with a printer engine characteristic.

Figure 9:
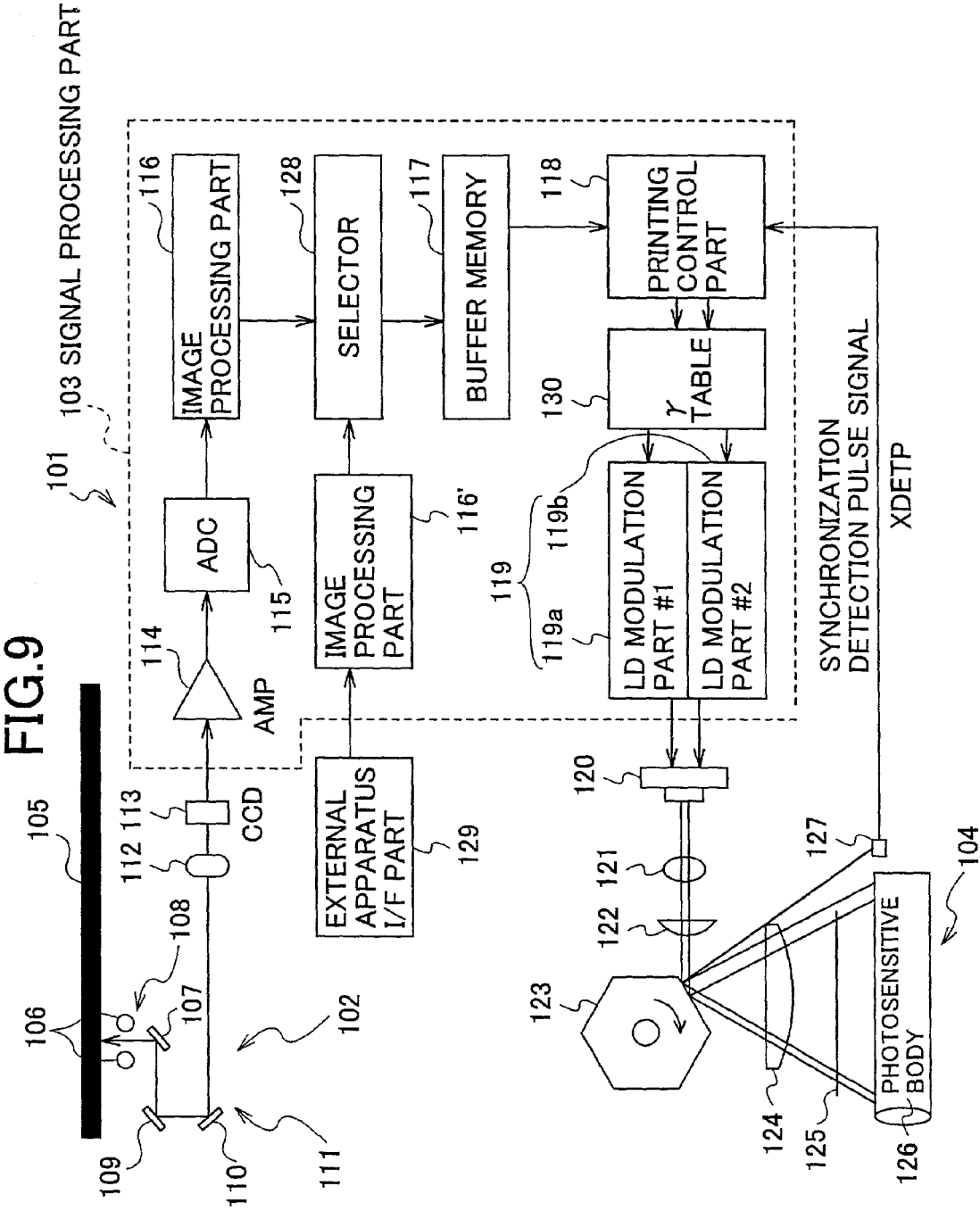
FIG. 9 is a schematic block diagram showing a configuration of a digital copier according to a second embodiment of the present invention.

Next, a description will be given of a digital copier 101 that is an imaging apparatus having the above-described feature according to the second embodiment of the present invention. FIG. 9 is a schematic diagram showing a configuration of the digital copier 101. According to FIG. 9, the digital copier 101 is composed of an image reading part 102 that reads and captures the printed image of an original sheet (not shown in the drawing), a signal processing part 103 that performs a variety of processing on image data input from the image reading part 102, and an image printing part 104 that prints out the image data output from the signal processing part 103 on a paper sheet (not shown in the drawing).

The image reading part 102 includes a contact glass 105 on which the original sheet is placed, a first scanning unit 108 composed of a line light source 106 having length in a primary or main scanning direction and a reflection mirror 107 reflecting a reflected light from the original sheet, and a second scanning unit 111 composed of a pair of reflection mirrors 109 and 110 provided in the path of the reflected light. The first and second scanning units 108 and 111 are supported under the contact glass 105 so as to be freely movable in a secondary or sub scanning direction with a velocity ratio of 2:1. The image reading part 102 further includes an imaging optical system 112 and a charge-coupled device (CCD) sensor 113 successively provided in the light path.

Figure 14:
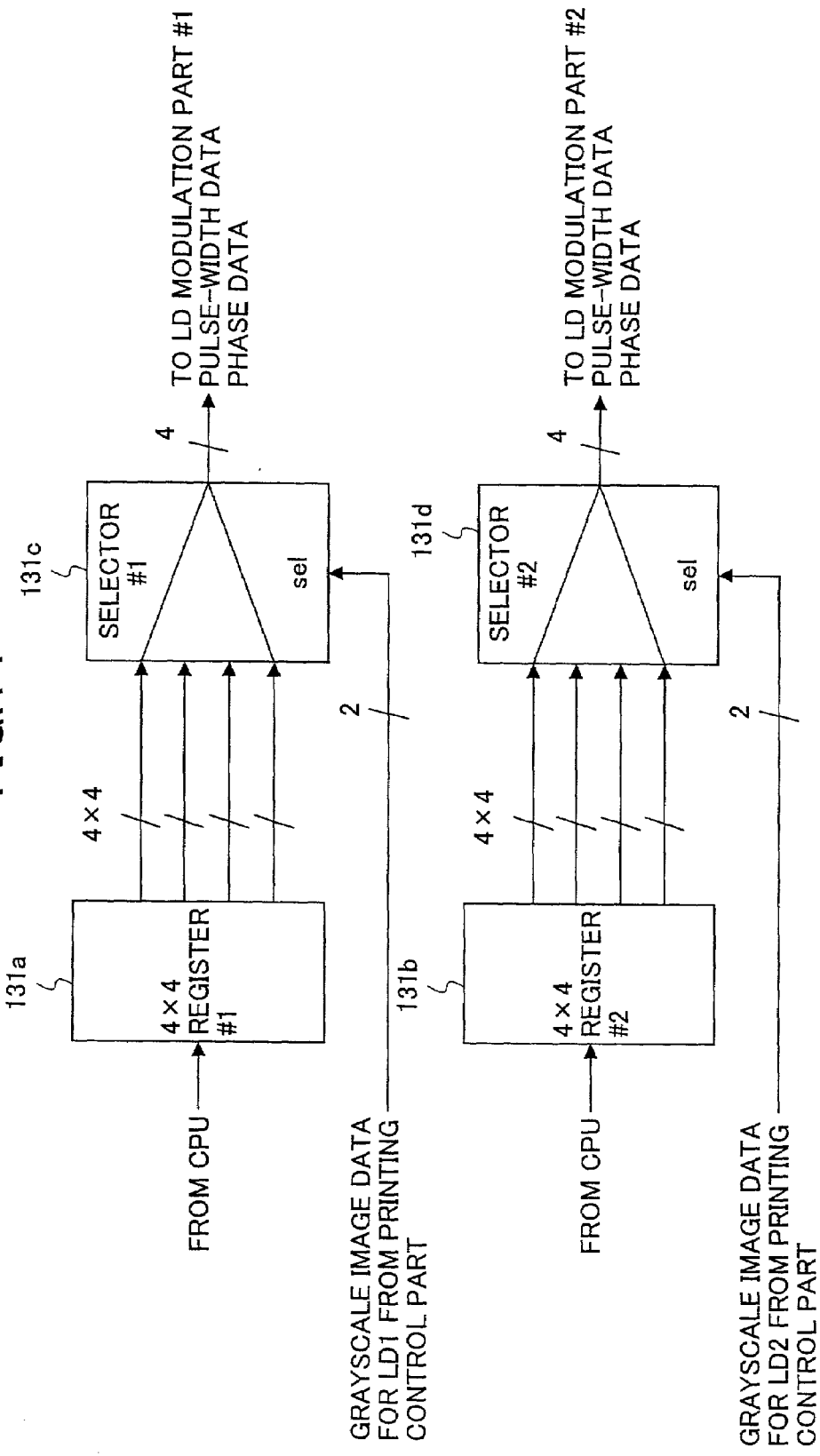
FIG. 14 is a block diagram showing a configuration of a γ table of the digital copier of FIG. 9.

The signal processing part 103 includes an amplifier 114 connected to the CCD sensor 113, an analog-to-digital (A/D) converter 115 connected to the amplifier 114, image processing parts 116 and 116' each performing a variety of processing such as lightness correction, magnification change processing, and editing and outputting grayscale image data composed of density data and a phase code, a selector 128 that selects one of the signals (image data) supplied from the image processing parts 116 and 116', a buffer memory 117 temporarily storing the image data supplied from the selector 128, a printing control part 118 that reads the grayscale image data from the buffer memory 117 in accordance with a timing control signal and performs processing such as range restriction and pattern combination, a γ table 130 that includes selectors 130$c$ and 130$d$ for multiple (two in this embodiment) beams output simultaneously as shown in FIG. 14, and an LD modulation part 119 that outputs driving currents modulated based on modulation code data supplied from the γ table 130. The LD modulation part 119 includes a first LD modulation part 119$a$ and a second LD modulation part 119$b$.

The image printing part 104 includes an LD unit 120 having two LDs connected to the LD modulation part 119, a collimator lens 121 and a cylindrical lens 122 provided in the paths of lights emitted from the LD unit 120, and a polygon mirror 123 provided rotatably in the primary scanning direction so that its reflection surface is positioned in the paths of the emitted lights. Further, the image printing part 104 includes an fθ lens 124 and a reflection mirror 125 provided in the primary scanning light paths of the polygon mirror 123, and a photosensitive body drum 126 provided rotatably in the secondary scanning direction so that its scanned surface is positioned in the primary scanning light paths. In the image printing part 104, a synchronization detector 127 composed of a photosensor is provided in a position on which the lights deflected by the polygon mirror 123 are incident immediately before the lights are incident on the photosensitive body drum 126 for scanning in the primary direction. The synchronization detector 127 has its output terminal connected to the printing control part 118 of the signal processing part 103 so as to feed back a synchronization detection pulse signal XDETP thereto.

More specifically, in the case of copying the image read from the original sheet, the image reading part 102 of the digital copier 101 has the first and second scanning units 108 and 111 scanning the printed image of the original sheet placed on the contact glass 105 in the secondary scanning direction so that the light reflected from the original sheet is focused on the CCD sensor 113 through the imaging optical system 112. Therefore, the CCD sensor 113 outputs dot-matrix image data composed of primary scanning lines that are successive in the secondary scanning direction to the signal processing part 103 line by line. At this point, the CCD sensor 113 outputs the image data of each line pixel by pixel in the primary scanning direction in accordance with given pixel clock timing after resetting the addresses of the image data by a line synchronization signal LSYNC. The image data is output to the signal processing part 3 line by line at a given line cycle based on the scanning speeds of the first and second scanning units 108 and 111 and the reading cycle of the CCD sensor 113.

Next, in the signal processing part 103, the image data input line by line is amplified by the amplifier 114 and is converted from an analog value to a digital value by the A/D converter 115. Then, the image data is subjected to a variety of processing such as lightness correction, magnification change processing, and editing in the image processing part 116 and is supplied to the buffer memory 117 via the selector 128 as multi-bit multi-level or grayscale image data.

Since the printing control part 118 outputs a timing control signal to the buffer memory 117, the image data stored in the buffer memory 117 is read out to the printing control part 118 in accordance with the timing control signal. At this point, the timing of the multi-beam image data is coordinated by reading out image data of a plurality of lines at the same time. The printing control part 118 performs a variety of processing such as range restriction and pattern combination on the input image data and supplies the grayscale image data to the γ table 130.

The γ table 130 converts the grayscale image data for the lines supplied from the printing control part 118 into independent modulation code data for the lines and outputs the modulation code data to the first and second LD modulation parts 119a and 119b of the LD modulation part 119, respectively. The LD modulation part 119 outputs a driving current modulated in accordance with the corresponding modulation code data to each LD of the LD unit 120 of the image printing part 104.

On the other hand, in the case of printing data supplied from an external apparatus, the image data is input to the buffer memory 117 via the image processing part 116' and the selector 128 from the external apparatus I/F part 129, and thereafter, the LD unit 120 is actuated in accordance with modulation code data by the same operation as the above-described copying operation. The image processing part 116' expands character code data and graphic data input from a host computer (not shown) via the external apparatus I/F part 129 into raster data and performs image processing such as contour correction so as to output multi-bit grayscale image data.

Here, a description will be given of the γ table 130. In this embodiment, an image of 600 dpi is output by a dual-beam printer engine. In this case, since the same data is read out from the buffer memory 117 for the two beams, the same image data supplied from the printing control part 118 is input to the γ table 130 for each of the two beams at the same time. The γ table 130, which is a data conversion part, converts the grayscale image data supplied from the printing control part 118 into two independent modulation code data. As shown in FIG. 14, the 65 table 130 includes two selectors 130c and 130d that are connected to registers 130a and 130b, respectively. The contents of the registers 130a and 130b are independently rewritable by a CPU that is a control part.

Data matching a printer engine characteristic is prewritten to each of the registers 130a and 130b. In this embodiment, four types of four-bit data composed of three-bit pulse-width data (density data) and single-bit data of a phase code are prewritten to each of the registers 130a and 130b.

Each of the selectors 130c and 130d prepared for the two beams selects and outputs a given one of the four types of data based on the two-bit grayscale image data for each beam supplied from the printing control part 118. The same image data is output from the printing control part 118 for the two beams. However, the γ table 130 may output a different modulation code data value for each of the two beams since different data may be set in the registers 130a and 130b.

Figure 11:
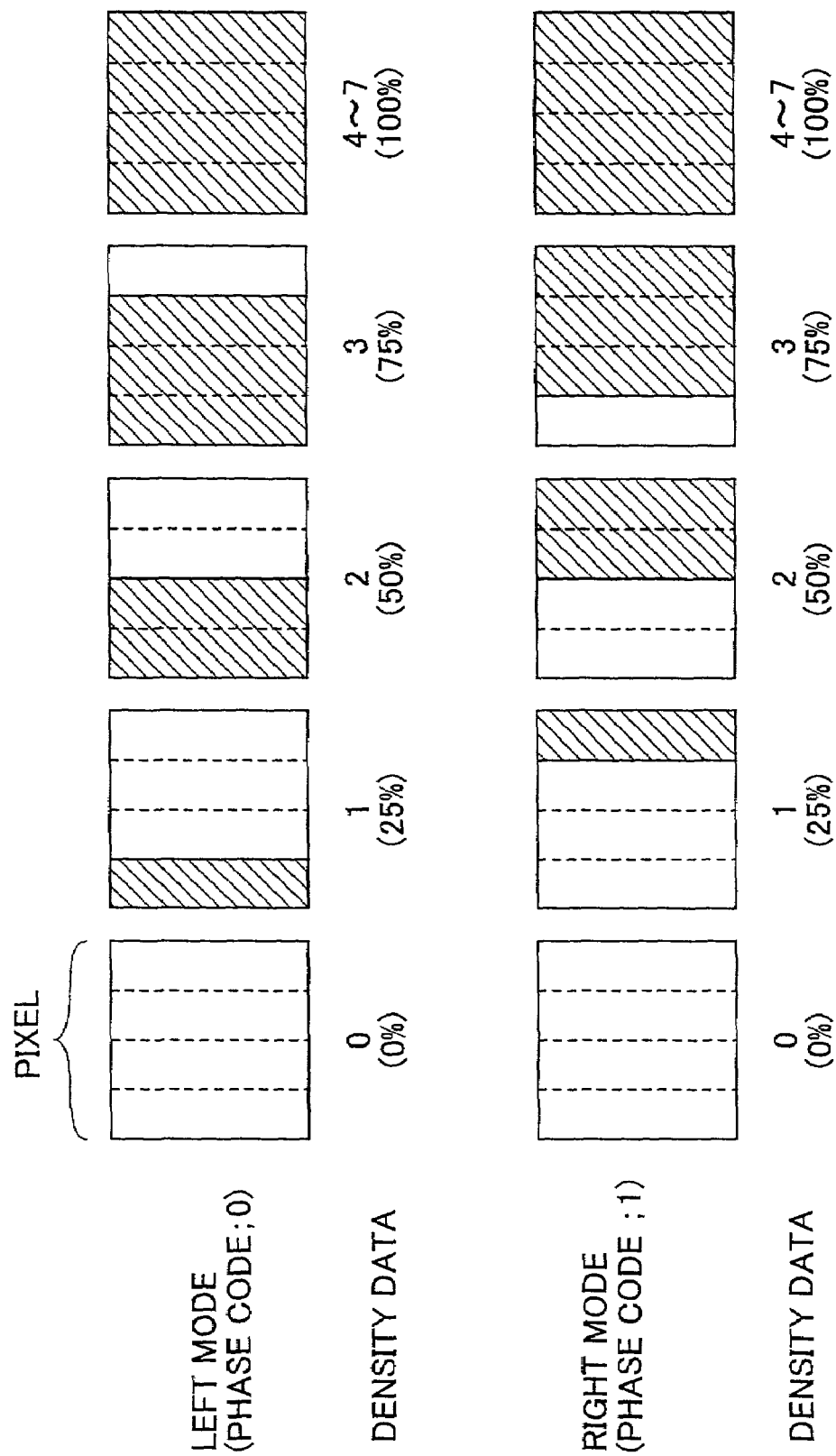
FIG. 11 is a diagram for illustrating grayscale resolution of one dot including a phase code.
Figure 12:
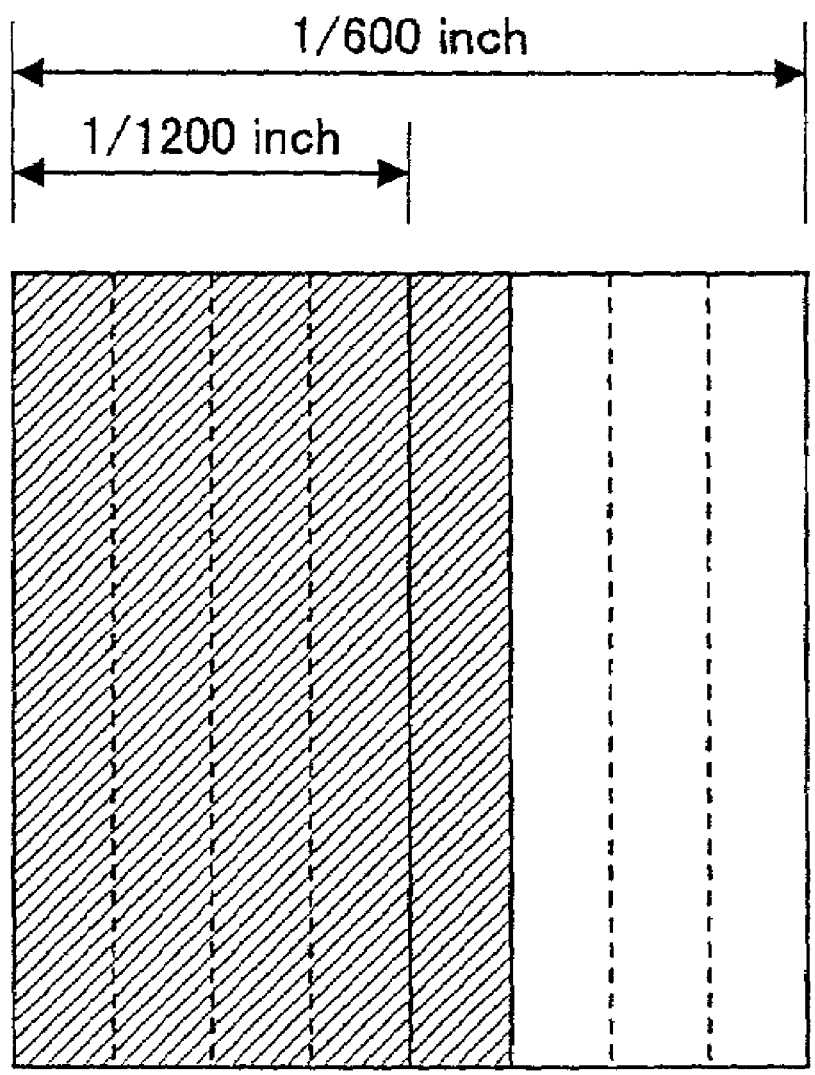
FIG. 12 is a diagram for illustrating ⅛-apart resolution values.
Figure 15:
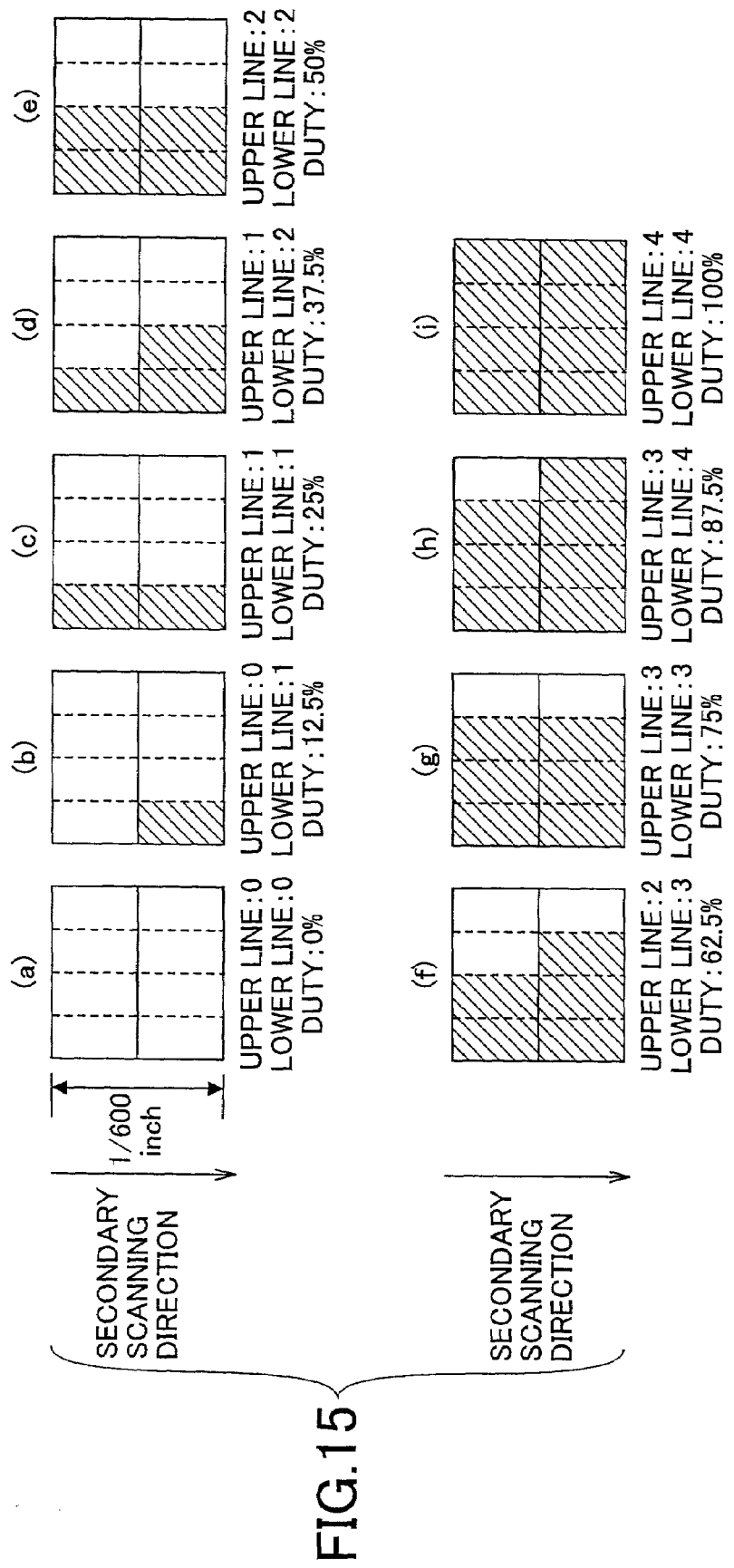
FIG. 15 is a diagram for illustrating grayscale resolution values of one dot by the digital copier of FIG. 9.

In the operation of the γ table 130, the selectors 130c and 130d select the given one of the data supplied from the registers 130a and 130b, respectively, based on the pulse-width data (density data) and the phase code composing the grayscale image data supplied from the printing control part 118. Thereby, density data of each duty as shown in FIG. 15 can be obtained by the register 130a and the selector 130c that correspond to the upper line of the beams and the register 130b and the selector 130d that correspond to the lower line of the beams. In FIG. 15, the phase code is 0 indicating the left mode shown in FIG. 11. That is, provided that combinations of a pair of the pulse-width data and phase code 0 of the register 130a (#1) and a pair of the pulse-width data and phase code 0 of the register 130b (#2) are given as "00", "01", "11", "12", "22", "23", "33", "34", and "44", the percentages of the duties are 0, 12.5, 25, 37.5, 50, 62.5, 75, 87.5, and 100%, respectively. Thereby, nine densities by ⅛-apart resolution values can be realized by PWM with ¼-apart resolution values per dot.

Further, FIG. 16 is a diagram showing a case of conversion where the lower one of each pair of scanning lines is weighted. Thereby, a horizontal fine line with a narrow width can be formed.

Figure 17:
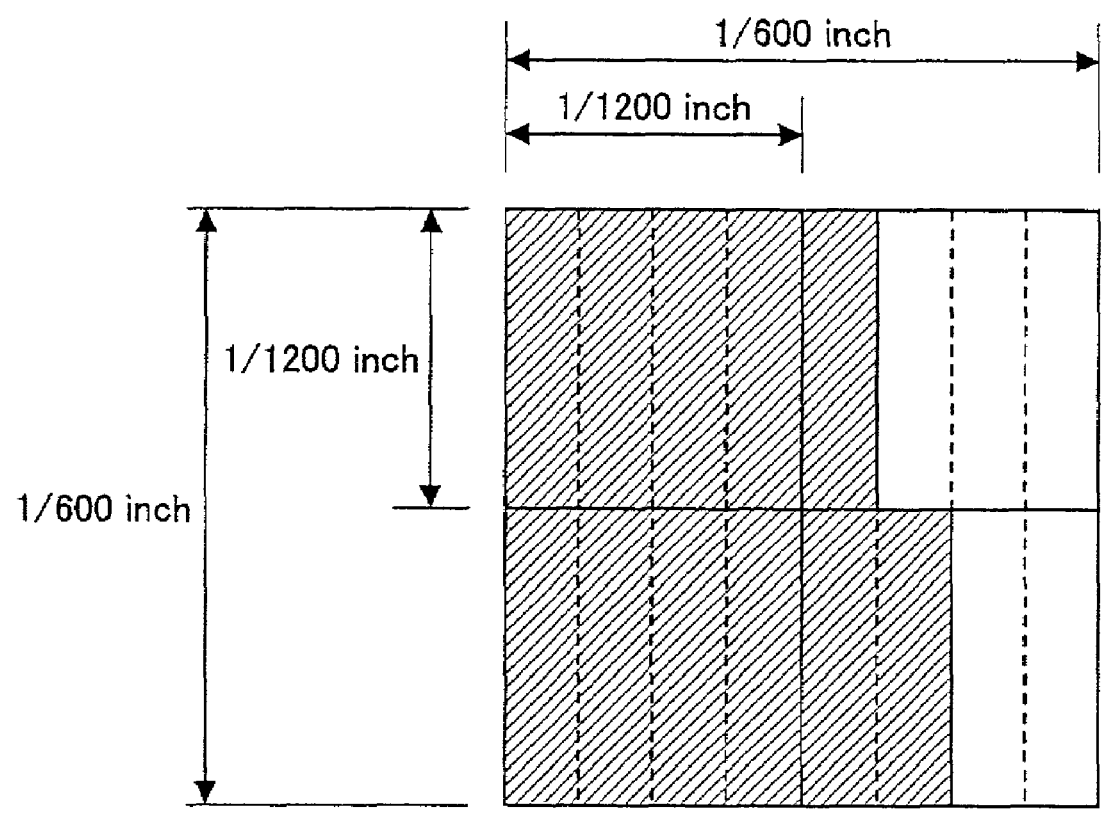
FIG. 17 is a diagram for illustrating density gradation representation with 1/16-apart resolution values by the digital copier of FIG. 9.

Further, by using the method disclosed in Japanese Laid-Open Patent Application No. 9-275494 by which method different data is assigned to each pixel having doubled image density in the primary scanning direction, 17 densities by 1/16-apart resolution values can be realized as shown in FIG. 17.

The following table 1 shows a relationship between the grayscale image data of the same value input to each of the selectors 130c and 130d shown in FIG. 14 and output data selected from values written to the registers 130a and 130b. A different pair of values is output depending on the grayscale image data.

TABLE 1

| INPUT | 00 | 01 | 10 | 11 |
|---|---|---|---|---|
| OUTPUT 1 | 0000 | 1000 | 1100 | 1111 |
| OUTPUT 2 | 0000 | 1100 | 1110 | 1111 |

As shown above, in this embodiment, it is assumed that four types of four-bit data of 0000, 1000, 1100, and 1111 are prewritten to the register 130a (#1) by the CPU and a different set of four types of four-bit data of 0000, 1100, 1110, and 1111 are prewritten to the register 130b (#2). Consequently, the respective four types of data are output from the four data lines of each of the registers 130a and 130b as shown in FIG. 14. The respective four types of data are input to corresponding input ports of each of the selectors 130c (#1) and 130d (#2). A given one of the respective four types of data is selected and output from each of the selectors 130c and 130d based on the two-bit grayscale image data input to the sel terminal of each of the selectors 130c and 130d. As described above, since the data supplied from the register 130a to the selector 130c is different from the data supplied from the register 130b to the selector 130d, different values are output from the selectors 130c and 130d when the same grayscale image data is input to the selectors 130c and 130d.

Specifically, according to TABLE 1, when the input grayscale image data is 00 or 11, the same data 0000 or 1111 is output from each of the selectors 130c and 130d. However, when the input grayscale image data is 01, the different data 1000 and 1100 are output from the selectors 130c and 130d, respectively. Similarly, the different data 1100 and 1110 are output from the selectors 130c and 130d, respectively, when the input grayscale image data is 10. As a result, when the input grayscale image data is 00, 01, 10, and 11, the density data for the two beams scanning the photosensitive body drum 126 at the same time is as shown in FIG. 15(a), (d), (f), and (i), respectively.

Back in FIG. 9, the LD modulation part 119 controls the beams emitted onto the photosensitive body drum 26 by employing PWM (modulation of the duration of light emission by a laser diode), power modulation (modulation of the light-emission power of a laser diode), or a combination of both modulation methods.

Figure 10:
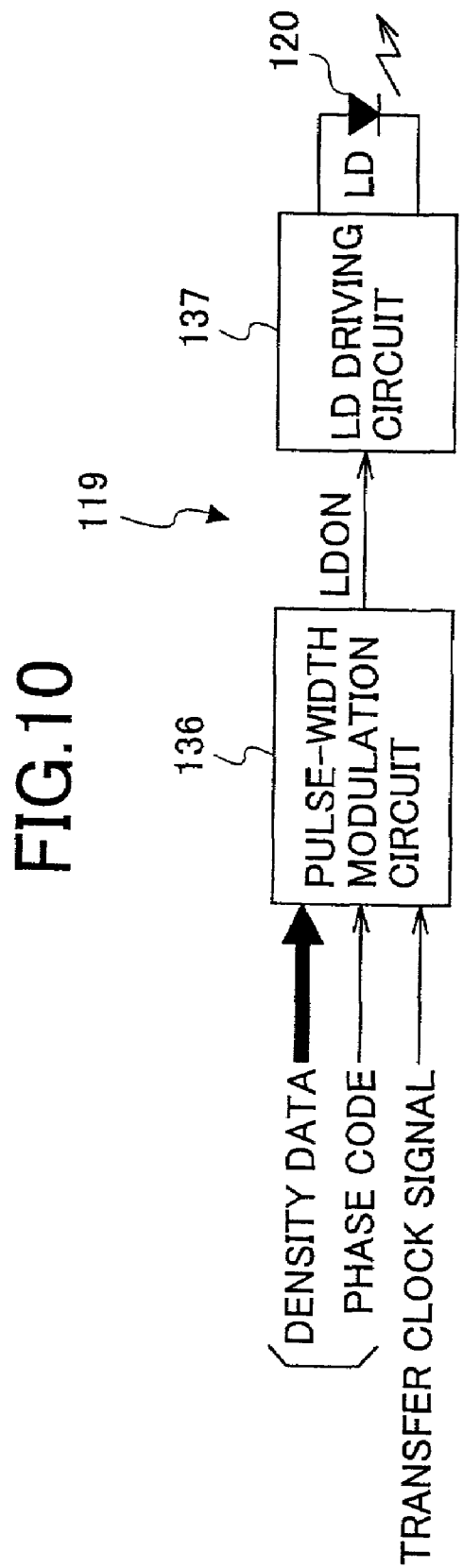
FIG. 10 is a block diagram showing a configuration of an LD modulation part of the digital copier of FIG. 9.

Each of the first and second modulation parts 119a and 119b of the LD modulation part 119 of this embodiment is composed of a pulse-width modulation circuit 136 and an LD driving circuit 137 as shown in FIG. 10.

The modulation code data, which is composed of the multi-bit pulse-width data (density data) and the phase code, is supplied from the γ table 130 to be input to the pulse-width modulation circuit 136 in accordance with a transfer clock signal. Then, the pulse-width modulation circuit 136 generates pulses in accordance with the modulation code data, and outputs the pulses to the LD driving circuit 137 as an LD ON signal LDON. The LD driving circuit 137 supplies an electric current to the corresponding LD of the LD unit 120 in accordance with the LD ON signal LDON to cause the LD to emit light. This embodiment shows the case of PWM, but a modulation method such as a combination of PWM and power modulation as disclosed in Japanese Laid-Open Patent Application No. 2-243363 may be employed.

In the image printing part 104, the light emitted from each LD of the LD unit 120 actuated in accordance with the modulation code data is converged by the collimator lens 121 and the cylindrical lens 122 to be deflected by the polygon mirror 123 for scanning. This scanning light is corrected by the fθ lens 124 to be focused on the scanned surface of the photosensitive body drum 126 which surface moves in the secondary scanning direction. Thereby, a dot-matrix electrostatic latent image is formed on the scanned surface of the photosensitive body drum 126. The electrostatic latent image is developed by toner (not shown in the drawing) and transferred onto the paper sheet. Thereby, image printing is realized.

In the image printing part 104, the synchronization detector 127, on which the primary or main scanning light deflected by the polygon mirror 123 is incident immediately before the primary scanning light is incident on the photosensitive body drum 126, outputs the synchronization detection signal XDETP, and the printing control part 118 of the signal processing part 103, to which the synchronization detection signal XDETP is input, outputs the timing control signal to the buffer memory 117. The output timing of the timing control signal is changed based on the size and the register adjustment value of the paper sheet onto which the electrostatic latent image is transferred so that the image data temporarily stored in the buffer memory 117 of the signal processing part 103 is read out to the print output of the image printing part 104 with proper timing.

The present invention is applicable not only to the dual-beam imaging apparatus in the above-described embodiment, but also to an imaging apparatus performing writing by using three beams or more at the same time.

As a multi-beam method using three beams or more, a method using four beams or eight beams may be employed. In the case of a method using four beams, the four beams may be separated into two upper beams and two lower beams, and data conversion may be performed for each of the upper and lower two beams in a γ table as shown in FIG. 14. Thereby, input image data of two lines can be simultaneously written to the photosensitive body drum 126 in four lines. Likewise, in the case of a method using eight beams, the eight beams may be separated into four groups of two lines so that input image data of four lines may be simultaneously written to the photosensitive body drum 126 in eight lines.

According to the present invention, in a scanning-type imaging apparatus, by performing a different data conversion for each scanning line so that one dot can be formed by a plurality of scans, the number of grayscale resolution values of one dot may be increased, a variety of dot shapes may be formed, and an image may be output with high quality.

Further, according to the present invention, since a data conversion part is composed of a conversion table employing a storage part and any value may be set for each scanning line in the conversion table by a control part, by a relatively simple configuration, data conversion may be performed differently for each scanning line, the number of grayscale resolution values of one dot may be increased, and an image may be output with high quality.

Furthermore, according to a multi-beam imaging apparatus of the present invention, by performing different data conversion for each beam so that one dot may be formed by one multi-beam scan, the number of grayscale resolution values of one dot may be increased, a variety of dot shapes may be formed, and an image may be output with high quality. Moreover, by using a conversion table having a storage part as a data conversion part of the multi-beam imaging apparatus and enabling any value to be set for each beam in the conversion table by a control part, data conversion may be performed differently for each scanning line, the number of grayscale resolution values of one dot may be increased, and an image may be output with high quality by a relatively simple configuration.

In other words, according to the present invention, since a pulse width of PWM is determined by considering a plurality of pixels adjacent in the secondary scanning direction as shown in FIG. 6 (two pixels in FIG. 6) as one set, this set of pixels, that is, the multiple pixels, can be controlled as one dot. Therefore, reliable grayscale density representation can be realized in print results without depending on the substantial resolution of an optical writing unit.

The present invention is not limited to the specifically disclosed embodiments, but variations and modifications may be made without departing from the scope of the present invention.

The present application is based on Japanese priority applications No. 2001-026875 filed on Feb. 2, 2001, No. 2001-086523 filed on Mar. 26, 2001, and No. 2002-011832 filed on Jan. 21, 2002, the entire contents of which are hereby incorporated by reference.

What is claimed is:

1. A multi-beam imaging apparatus forming an image by performing scanning by deflecting a plurality of light beams, the multi-beam imaging apparatus comprising:
- an image input part configured to input image data obtained from scanning each scan line of an original image; and
- a plurality of data conversion parts configured to convert, for each of the plurality of light beams, a resolution of the image data input by said image input part,
- wherein said plurality of data conversion parts are configured to perform different conversion operations; and
- wherein each data conversion parts includes a register to which rewritable pulse-width data and a rewritable phase code are input and a selector that selects a given one of written contents of the register based on the input multi-level image data.

2. The multi-beam imaging apparatus as claimed in claim 1, wherein each of the data conversion parts includes a data conversion table using a storage part.

3. The multi-beam imaging apparatus as claimed in claim 2, further comprising a control part that sets any independent value in each of said conversion tables for the corresponding light beam.

4. The multi-beam imaging apparatus as claimed in claim 1, wherein said data conversion parts comprise a part that converts the input multi-level image data into modulation code data so that the light beams are output differently from each other based on the modulation code data.

5. The multi-beam imaging apparatus as claimed in claim 1, wherein the rewritable pulse-width data and phase code are matched in advance with a characteristic of the multi-beam imaging apparatus.

6. The apparatus of claim 1, wherein said data conversion part is configured to convert the resolution of the image data input by said image input part to be a higher resolution.

7. A multi-beam imaging apparatus forming an image by performing scanning by deflecting a plurality of light beams, the multi-beam imaging apparatus comprising:
- means for inputting image data obtained from scanning each scan line of an original image; and
- a plurality of data conversion means for converting, for each of the plurality of light beams, a resolution of the image data input by the means for inputting,
- wherein said plurality of data conversion means perform different conversion operations; and
- wherein each of said data conversion means includes a register to which rewritable pulse-width data and a rewritable phase code are input and a selector that selects a given one of written contents of the register based on the input multi-level image data.

8. The multi-beam imaging apparatus as claimed in claim 7, wherein each of the data conversion means includes a data conversion table using storage means.

9. The multi-beam imaging apparatus as claimed in claim 8, further comprising control means that sets any independent value in each of said conversion tables for the corresponding light beam.

10. The multi-beam imaging apparatus as claimed in claim 7, wherein said data conversion means comprise means for converting the input multi-level image data into modulation code data so that the light beams are output differently from each other based on the modulation code data.

11. The multi-beam imaging apparatus as claimed in claim 7, wherein the rewritable pulse-width data and phase code are matched in advance with a characteristic of the multi-beam imaging apparatus.

* * * * *